United States Patent

Brown

[15] 3,656,134
[45] Apr. 11, 1972

[54] LIQUID LEVEL DETECTOR

[72] Inventor: Fred Brown, Chicago, Ill.

[73] Assignee: Union Tank Car Company, Chicago, Ill.

[22] Filed: July 27, 1970

[21] Appl. No.: 58,463

[52] U.S. Cl. .................................................. 340/244, 340/1 L
[51] Int. Cl. ........................................................ G01s 9/66
[58] Field of Search ........................ 340/244 C, 244, 1 L, 258; 73/304

[56] References Cited

UNITED STATES PATENTS

| | | | |
|---|---|---|---|
| 3,326,042 | 6/1967 | Ross et al. | 340/1 L |
| 3,079,596 | 2/1963 | Atkinson | 340/1 L |
| 2,527,769 | 10/1950 | Sinsheimer | 340/258 X |
| 3,086,196 | 4/1963 | Vande Sande | 340/258 X |
| 3,184,969 | 5/1965 | Bolton | 340/1 L |
| 3,553,636 | 1/1971 | Baird | 340/244 |

*Primary Examiner*—John W. Caldwell
*Assistant Examiner*—Howard S. Cohen
*Attorney*—Jack C. Berenzweig

[57] ABSTRACT

There is disclosed an apparatus for detecting the presence or absence as well as the height of a liquid lading in a vessel comprising; a sheath insert adapted to be inserted into the vessel whereby at least a portion of the sheath insert is immersed within the liquid lading, a liquid couplant contained within the sheath insert, a transmitting device, a portion of which is located within the sheath insert and is adapted to transmit an ultrasonic signal through the wall of the sheath insert, a receiving device, a portion of which is located within the sheath insert and is adapted to receive the transmitted ultrasonic signal, a first means for establishing a signal path of fixed length through which the ultrasonic signal must travel from the transmitting device to the receiving device wherein a portion of the signal path is adapted to pass through the wall of the sheath insert and into the vessel, and electronic circuit means associated with the transmitting device and the receiving device whereby the electronic circuit means is responsive to the magnitude and time duration of the ultrasonic signal travelling through the fixed signal path thereby indicating the presence or absence of the liquid lading.

In a first preferred embodiment, the first means for establishing the signal path of fixed length comprises a reflector located within the vessel and spaced a fixed distance from the sheath insert wherein the ultrasonic signal from the transmitting device is reflected by the reflector and received by the receiving device in a preselected time interval only when the ultrasonic signal passes through the liquid lading.

In a second preferred embodiment, the first means for establishing the signal path of fixed length comprises a transmitting device located within a first sheath and a receiving device located within a second sheath wherein the first and second sheaths are a fixed distance apart and whereby the ultrasonic signal from the transmitting device is received by the receiving device in a preselected time interval only when the ultrasonic signal passes through the liquid lading between the first and second sheath.

18 Claims, 8 Drawing Figures

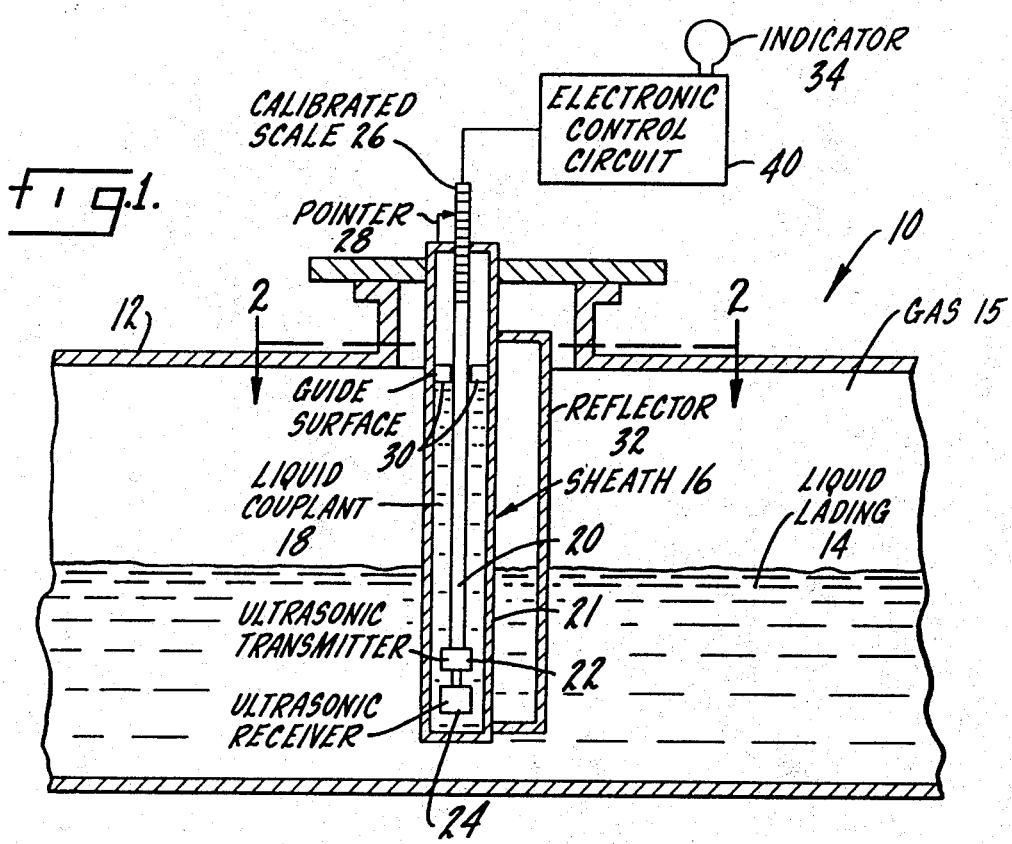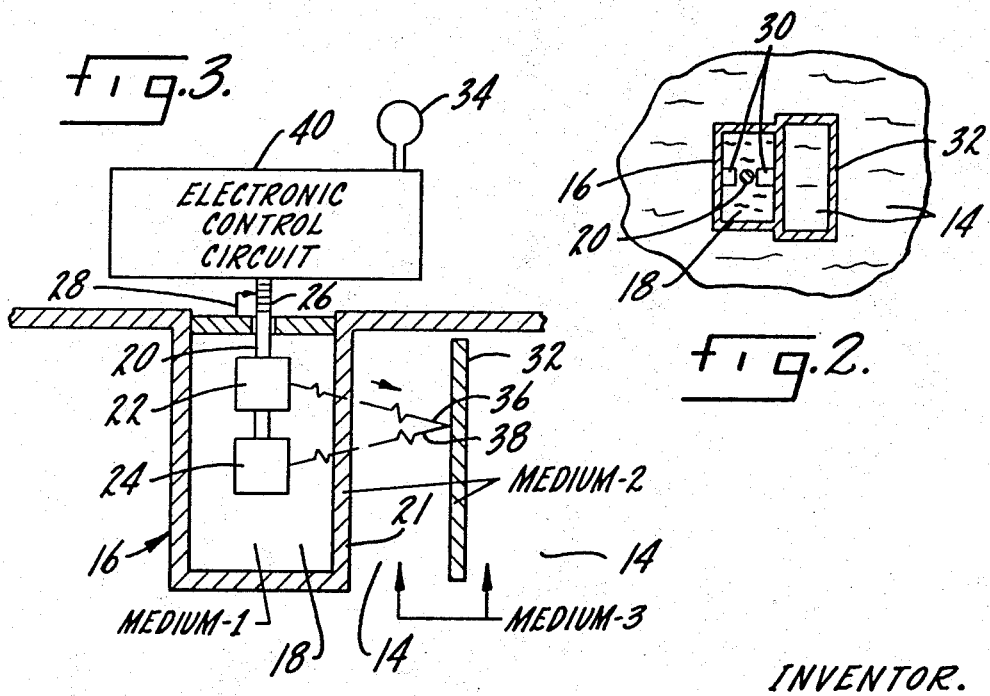

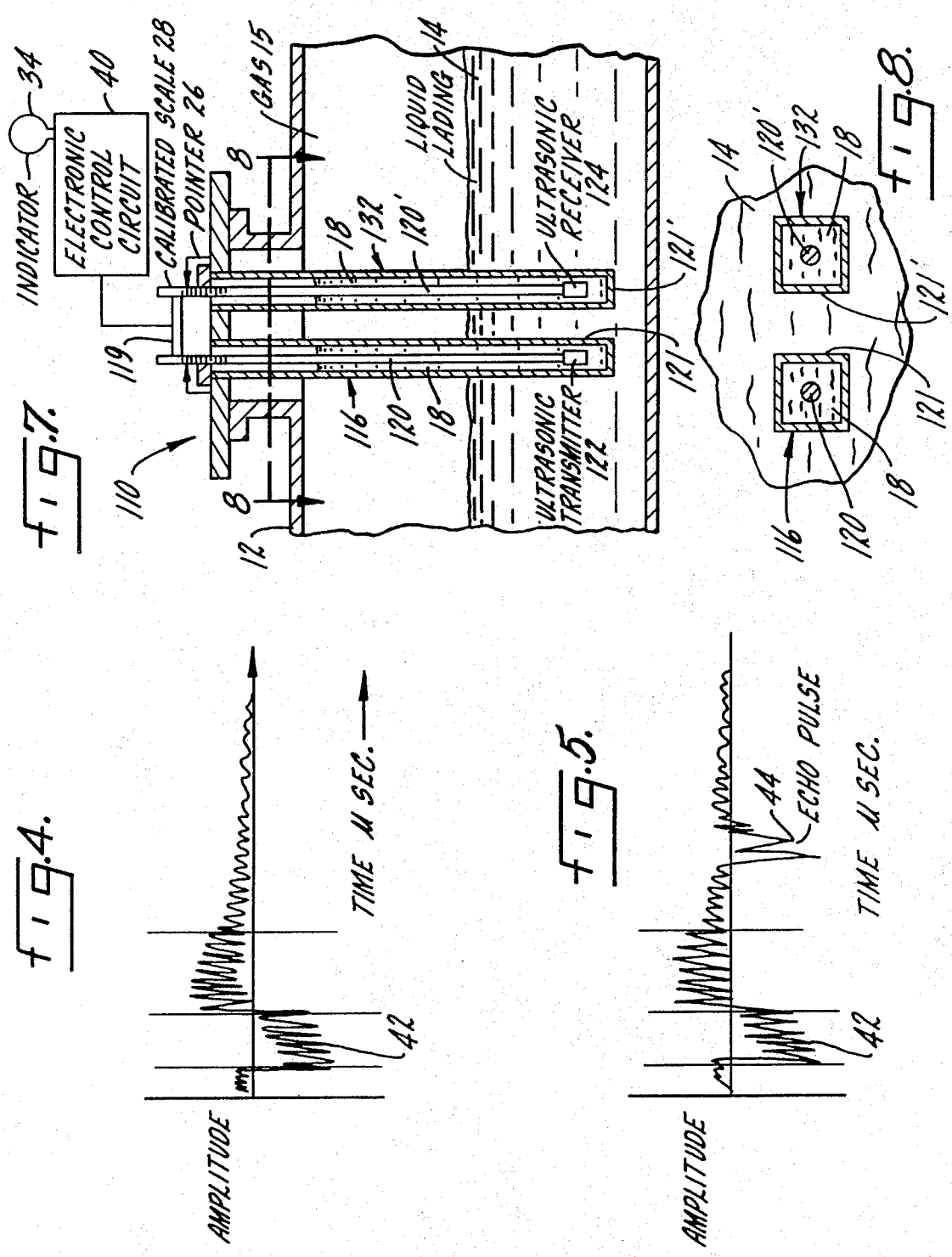

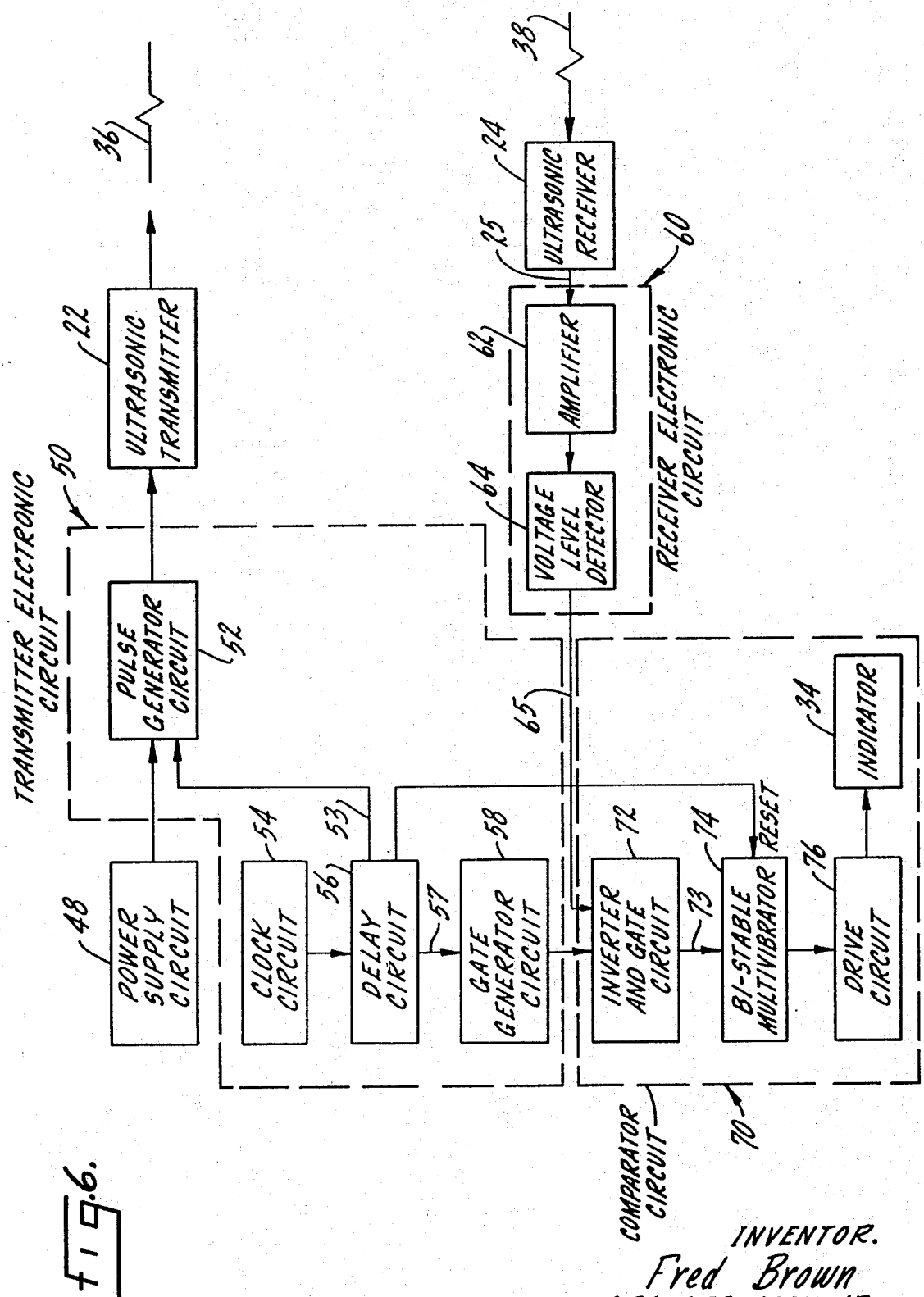

LIQUID LEVEL DETECTOR

BACKGROUND OF THE INVENTION

The present invention relates to an apparatus for measuring the location of a liquid-gas interface and for measuring the depth of a liquid lading within a vessel. More particularly, the invention relates to a device for indicating the depth of a liquid lading in a vessel or similar container by the use of ultrasonic wave trains.

It is heretofore been proposed to utilize an ultrasonic echo method, similar to depth sounding, for the purpose of measuring the depth of a liquid lading in a vessel. This method involves placing an electro-acoustic transducer in the bottom of the tank and shooting a beam of ultrasonic vibrations towards the surface. This method has encountered many limitations, including problems of installation, maintenance, erroneous signals due to bubbles, and also signal failure at a rough or foaming surface. In addition, further limitations in this type of apparatus have been encountered since, for each vessel of a different size, it is necessary to adjust the system so that the time of travel of the reflected wave through the liquid will be taken into account.

A second liquid level detecting device heretofore known provides a means for measuring the pressure differential between points in the gas over the liquid and some reference point below the surface of the liquid. The pressure differential was then proportional to the liquid level. This method is limited in that the response of the detector is hindered by changes in atmospheric pressure and ambient temperature.

A third prior art method of liquid level detection has been to use a thermistor placed in a liquid. Because the resistance of the thermistor in a liquid of any given temperature will be lower than the temperature of the thermistor in air, the thermistor provides a method of recognizing the change between the fluid state and the gas state within a vessel. Again, this method of level detection is sensitive to changes in pressure and ambient temperature and is, therefore, limited and may not be generally used.

SUMMARY OF THE INVENTION

The general purpose of this invention is to provide a liquid level detector which embraces all of the advantages of similarly employed liquid level detectors and possesses none of the aforedescribed limitations. To attain this, the present invention contemplates the utilization of a sheath which is inserted into the vessel whereby at least a portion of the sheath is immersed within the liquid lading within the vessel. A liquid couplant is contained within the sheath and a reflector is located within the vessel and spaced a fixed distance apart from the sheath. A probe is movably inserted into the sheath. The probe includes a transmitting transducer for transmitting an ultrasonic signal towards the reflector through the wall of the sheath as well as a receiving transducer for receiving the ultrasonic signal reflected by the reflector. Electronic circuit means are associated with the transmitting transducer and the receiving transducer whereby the circuit means is responsive to the magnitude and time duration of the reflected ultrasonic signal wherein the time duration and magnitude of the reflected ultrasonic signal is indicative of the presence or absence of the liquid lading.

It is, therefore, an object of the present invention to provide an apparatus for detecting the presence or absence of a liquid lading in a vessel which is independent of temperature, pressure and/or the size of the vessel.

Another object is to provide an apparatus for measuring the level of a liquid within a vessel which is economical to manufacture and which may be readily inserted into any vessel regardless of type or size or content.

A further object is to provide an apparatus in which the transmitting transducer and the receiving transducer are not inserted into the liquid lading contained within the vessel but are inserted into a liquid couplant.

Still another object is to provide an apparatus for detecting the presence or absence of a body of liquid at a location which utilizes modular electronic components.

Yet another object is to provide an apparatus for measuring the level of a liquid within a vessel wherein the apparatus is immune from the corrosive effects of the liquid lading contained within the vessel.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a diagrammatic view, partly in section, of a preferred embodiment of the invention.

FIG. 2 is a sectional view of the apparatus taken on the lines 2—2 of FIG. 1.

FIG. 3 is a diagrammatic view of the apparatus shown in FIG. 1 depicting the path of travel of the ultrasonic waves through the liquid couplant and liquid lading.

FIG. 4 is a wave form depicting the amplitude of the ultrasonic wave when the fixed path of travel is above the liquid level.

FIG. 5 is a wave diagram depicting the amplitude of the ultrasonic wave when the path of travel is through the liquid lading.

FIG. 6 is a block diagram showing the electronic control circuitry associated with the apparatus shown in FIG. 1.

FIG. 7 is a diagrammatic view of an alternative embodiment of the invention.

FIG. 8 is a sectional view taken along the lines 8-8 of FIG. 7.

DESCRIPTION OF THE PREFERRED EMBODIMENT

Referring now to the drawings, wherein like reference characters designate like or corresponding parts throughout the several views, there is shown in FIG. 1, which illustrates a preferred embodiment, a liquid level detector apparatus 10. The liquid level detector 10 is capable of achieving liquid measurements under most conditions of service and is capable of adequately discriminating between full or above and empty or below states. Discrimination or detection of the liquid is achieved by recognizing that a substantial difference in the propagation characteristics of an ultrasonic wave occurs in the presence or absence of a liquid. Analysis has shown that the time required for an ultrasonic pulse to pass through a liquid and a gas is sufficiently different to be a reliable indicator of liquid presence.

The liquid level detector 10 is adapted to be inserted into a liquid storage vessel 12 as shown in FIG. 1. In the preferred embodiment, the liquid storage vessel 12 may comprise a tank car but it will be recognized that any liquid storage vessel may incorporate the liquid level detector 10. Contained within the liquid storage vessel 12 is a liquid lading 14 and a gas or air 15. The liquid storage vessel may either be pressurized or non-pressurized since the liquid level detector 10 is insensitive to pressure variations. The liquid level detector 10 comprises a sheath 16 which is inserted into the liquid storage vessel 12. Sheath 16 may be of any length; however, it is necessary that it be long enough so that a portion of the sheath 16 remains in contact with the liquid lading 14 at all times until the liquid storage vessel 12 is considered in its "empty" condition. Contained within the sheath 16 is a liquid couplant 18. As will be explained below, many liquids may serve as a liquid couplant, the only criteria being that they have a high ultrasonic attenuation and also have a higher boiling point and a lower freezing point than the liquid lading 14 contained within the liquid storage vessel 12. A probe 20 is inserted into the sheath 16. An ultrasonic transmitter 22 and an ultrasonic receiver 24 are mounted on one end of the probe 20. In the preferred embodiment, both the ultrasonic transmitter 22 and the ultrasonic receiver 24 may comprise a conventional piezoelectric crystal. Connected to the ultrasonic transmitter 22 and the ultrasonic receiver 24 is an electronic control circuit 40. The electronic control circuit 40 has associated with it a transmitter control circuit 50 (FIG. 6) and a receiver control circuit 60 (FIG. 6) and a comparator circuit 70 (FIG. 6). A calibrated scale 26 is placed along the opposite end of the probe 20. A marker or pointer 28 is mounted in association with the calibrated scale 26 for determining the exact height of the liquid lading 14.

The probe 20 is movably mounted within the sheath 16. In order to insure accurate alignment of the probe, a plurality of guide surfaces 30 may be provided along the inner walls of the sheath 16. Lastly, a reflector 32 is mounted a fixed distance away from the sheath 16. The reflector 32 may be placed at any fixed distance away from the sheath so long as this distance is known. However, to insure uniformity among all similar liquid level detector apparatuses regardless of the size of the vessel it is being used in, it is desirable to make this fixed distance equal in all instances. In this manner, the liquid level detector 10 may be used in any storage vessel, regardless of size.

FIG. 2 is a top cross-sectional view of the liquid level detector apparatus 10. It can clearly be seen that the probe 20 is completely surrounded by the liquid couplant 18 and in turn both the sheath 16 and the reflector 32 are surrounded by the liquid lading 14. Clearly, the only moving part present in the liquid detector is the probe 20. Furthermore, it can be seen that the ultrasonic transmitter 22 and the ultrasonic receiver 24 are immune from the corrosive effects of the liquid lading since these elements are surrounded by the liquid couplant 18 and do not come in contact with the liquid lading 14. The liquid couplant can be chosen so as to eliminate all corrosive effects on the piezoelectric crystals which comprise the ultrasonic transmitter 22 and the ultrasonic receiver 24.

Before proceeding further with the description of the liquid level detector apparatus 10, it is necessary to understand several basic characteristics of ultrasonic devices. In response to an electronic signal, a piezoelectric crystal or ultrasonic transmitter will generate ultrasonic signals or pulses. These ultrasonic signals are capable of travelling through solids as well as liquids but have a difficult time of travelling through gas. Depending upon the angle of travel of the signal, the ultrasonic waves will be either refracted or reflected at boundaries or interfaces between differing media through which the ultrasonic waves are travelling. When the wave is travelling at a critical accute angle and when the two different media result in a mismatch of acoustic impedance, reflection of the wave occurs.

Referring now to FIGS. 1 and 3 taken together, the operation of the liquid level detector apparatus 10 will be explained. Operation of the apparatus 10 is based upon the propagation of an ultrasonic pulse 36 which is transmitted by the ultrasonic transmitter 22 in response to an electronic signal through a fixed path. The fixed path is defined as passing through the wall 21 of the sheath 16 and directed towards the reflector 32. It can be seen that the ultrasonic wave 36 thereby travels through the liquid couplant 18, the wall 21 and the liquid lading 14. As the ultrasonic wave passes through the wall 21 from the liquid couplant 18, it is refracted slightly. Upon passing through the liquid lading 14, greater refraction occurs. This causes the ultrasonic wave to travel at an accute angle with respect to the reflector 32. Upon passing from the liquid lading 14 to the reflector 32, an acoustic impedance mismatch occurs and the ultrasonic wave is reflected rather than refracted thereby yielding a reflected ultrasonic pulse designated by the numeral 38.

The reflected ultrasonic pulse 38 again passes through the liquid lading 14, the wall 21 of the sheath 20 and the liquid couplant 18 and is received by the ultrasonic receiver 24. The ultrasonic receiver 24 converts the ultrasonic wave into an electrical signal which is then transmitted to the electronic control circuit 40. This signal is compared with the initial electronic signal which generated the transmitted ultrasonic pulse 36 and if the total length of time of travel of the ultrasonic wave from the ultrasonic transmitter 22 to the ultrasonic receiver 24 is within a predetermined and preselected time interval, and is of sufficient magnitude, a conventional indicator 34 will denote this fact. If, on the other hand, the time of travel of the ultrasonic pulse from the transmitter 22 to the receiver 24 is greater than the predetermined preselected time interval, the indicator 34 will not be energized. This non-energized condition indicates that the ultrasonic wave did not travel through the liquid lading 14 but travelled through the gas 15 since the total length of time of travel of the ultrasonic wave through gas is much greater than the total length of time of travel of an ultrasonic wave through liquid. By vertically moving the probe up and down, the actual interface can easily be determined since the indicator 34 will continually show the liquid state and/or the gaseous state and at the point of change from one state to the other, the interface has been found. By utilizing the calibrated scale 26 in conjunction with the pointer 28, the actual depth of the liquid may easily be determined from the scale.

An alternative method of indicating whether or not the ultrasonic pulse is passing through the liquid lading 14 or through the gas or air 15 is by utilizing an oscilloscope. FIG. 4 discloses a wave form showing the amplitude of the ultrasonic wave received by the receiving transducer 24 when the path of travel of the ultrasonic wave 36 is through the gas 15 thereby indicating the absence of the liquid lading 14. FIG. 5 shows a wave form received when the path of travel of the ultrasonic pulse 36 is through the liquid lading 14. FIGS. 4 and 5 depict several distinct portions of the wave form. The first excursion of magnitude 42 indicates the pulse 36 as it is travelling through the liquid couplant 18 and the wall 21. The second excursion 44 indicates the wave reflection off the reflector 32. When the fixed path of travel of the ultrasonic wave passes through the gas 15 rather than the liquid lading 14, the wave form in FIG. 4 does not contain the excursion of magnitude 44 since the time that it would take the wave to reach the reflector 32 would be so great that this amplitude excursion 44 would not appear within the required preselected time oscilloscope. and thus, would not be displayed on the oscilloscope. Depending upon the composition of the liquid lading 14, this preselected time interval is varied so that an accurate indication of the presence or absence of liquid may be utilized based upon the time required for the ultrasonic pulse to pass through the liquid and/or the gas.

Referring to FIG. 3, in the preferred embodiment, medium 1, i.e., the liquid couplant 18, may comprise either water or oil of equivalent property and medium 2, i.e., the sheath 16 and the reflector 32 may comprise steel. Utilizing these materials, the liquid lading 14 within the tank may comprise water, chloroform, glycerol, acetone or any other similar substance while the gaseous media 15 may comprise air. It will be recognized that none of these materials are critical and may readily be changed. The only critical condition is that the composition of medium 2, i.e., the sheath 16 and the reflector 32 must be a homogenous material. The electronic control circuit 40 may comprise conventional circuitry. For example, a Transigate Style No. 50E550, manufactured by Automation Industries may be utilized. The transigate comprises a pulse circuit for actuating the ultrasonic transmitter 22 and also contains an electronic circuit for receiving the signal generated by the ultrasonic receiver 24. These two signals may be compared by the transigate and if the signal received by the ultrasonic receiver 24 is received within a fixed period of time, the transigate will indicate this. However, in the preferred embodiment, a specific form of electronic control circuit 40 will be utilized. FIG. 6 discloses the preferred embodiment of electronic control circuit 40.

Referring now to FIG. 6, electronic control circuit 40 comprises a transmitter electronic control circuit 50, a receiver electronic control circuit 60 and a comparator control circuit 70. Electronic control circuit 40 as shown in FIG. 6 operates as an electronic pulse echo device and is used for the purpose of identifying the presence of a reflected ultrasonic signal occurring at a selected predetermined time after the transmission of an ultrasonic pulse. A conventional DC power supply circuit 48 may be used to supply DC current to the transmitter electronic circuit 50.

The transmitter electronic circuit 50 comprises a conventional pulse generator circuit 52, a conventional clock circuit 54, a conventional delay circuit 56 and a conventional gate generator circuit 58. The transmitter electronic circuit 50 is used to supply pulses of a predetermined length to the ultrasonic transmitter 22. In addition, the transmitter electronic circuit 50 also functions to synchronize the transmission of these pulses with their ultimate detection by the receiver electronic circuit 60. A series of pulses generated by the clock circuit 54 are fed to a delay circuit 56. The delay circuit 56 initiates an output pulse of a predetermined length at the beginning of each positive transition of the clock circuit 54. This output pulse appears on the lead 57. Coincidentally with the output pulse on lead 57, a pulse also occurs on the lead 53 which in turn triggers the pulse generator circuit 52, supplying a pulse to the ultrasonic transmitter 22. This electronic pulse applied to the input of the ultrasonic transmitter 22 causes a series of ultrasonic waves 36 to be transmitted into the media. At the termination of the output pulse from the delay circuit 56 on lead 57, the gate generator circuit 58 is triggered. The output of the gate generator circuit 58 is shorter than the output of the delay circuit 56, since the length of the output from the delay circuit 56 determines the length of the output signal from the gate generator circuit 58. This length is adjustable and as will become clear below, is preselected with regard to the propagation properties of the liquid lading in the tank. In essence, the gate generator circuit 58 determines the length of time within which the comparator electronic circuit 70 will be responsive to pulses received from the receiver electronic circuit 60.

The receiver electronic circuit 60 comprises an amplifier 62 and a voltage level detector 64. When ultrasonic receiver 24 receives an echo pulse 38 from the reflector 32 (FIG. 3), an electronic signal is generated on lead 25. This signal is then amplified by the amplifier 62 in a conventional manner and the output of the amplifier 62 is fed to a conventional voltage level detector 64. The voltage level detector is optional and is used merely to make the electronic control circuit 40 immune from spurious noises of small intensity or magnitude. Whenever a pulse of a predetermined magnitude occurs on the output of amplifier 62, the voltage level detector 64 generates a signal on its output lead 65. The output from the voltage level detector 64 is then fed to the input of the comparator electronic circuit 70.

Both the output from the receiver electronic circuit 60 as well as the output from the gate generator circuit 58 are fed to an inverter and AND gate circuit 72 of the comparator electronic circuit 70. The inverter insures that both signals are of a proper polarity and if a signal is present on both input leads of the inverter and AND gate circuit 72, an output pulse will occur on the output lead 73. This pulse is then fed to a bi-stable multivibrator 74. The purpose of the circuit 72 is to cause an output from the AND gate whenever the short output pulses from the gate generator circuit (delayed by the delay time of the delay circuit 56) occurs coincident with an output from the level detector 64. These coincident input signals to the comparator electronic circuit 70 are an indication of an echo entering the ultrasonic receiver 24 at a preselected time after the generation of the ultrasonic signal by the ultrasonic transmitter 22. The output from the bi-stable multivibrator 74 is then fed to a conventional drive circuit 76 which in turn triggers the indicator 34 indicating that the ultrasonic signal was received by the ultrasonic receiver 24 within a preselected time, thereby indicating that the ultrasonic path over the fixed distance occurred within a preselected time (i.e., indicating the presence of the liquid lading 14.)

If the inverter and AND gate circuit 72 does not receive a signal from the voltage level detector 65 while a signal is present from the output of the gate generating circuit 58, the indicator is not actuated and this indicates that the path of travel of the ultrasonic wave did not pass through the liquid media but passed through the air instead, thereby indicating the absence of the liquid media at this level. After each pulse received by the inverter and AND gate 72, whether or not a signal occurs on lead 65, the bi-stable multivibrator is reset by a signal occurring from the output of the delay circuit 56. This procedure is continued for each cycle of the clock circuit 54 and the probe is moved vertically up and down until the indicator is actuated and the liquid level is found.

As was indicated, the electronic circuit shown in FIG. 6 comprises conventional elements. The following exemplary components are employed in the electronic control circuit 40 but it will be recognized that these components are merely illustrative of the invention and various modifications may be made without departing from the spirit and the scope of the invention.

| Numeral | Element Name | Part Number |
| --- | --- | --- |
| 52 | Differentiator Circuit | MC 849 |
|  | Drive Transistor | 2N 5135 |
|  | SCR | 2N 4102 |
| 54 | Astable Multivibrator | Fairchild UA 914 |
| 56 | Monostable Multivibrator | Fairchild 9601 |
| 58 | Monostable Multivibrator | Fairchild 9601 |
| 62 | Amplifier | Fairchild UA 719 |
| 64 | Voltage Threshold Detector | Fairchild UA 710 |
| 72 | Astable Multivibrator | Fairchild UA 914 |
| 74 | Astable Multivibrator | Fairchild UA 914 |
| 76 | Drive Transistor | 2N 5135 |

Referring now to FIGS. 7 and 8, a liquid level detector apparatus 110 is disclosed which constitutes an alternative preferred embodiment. It can clearly be seen that liquid level detector apparatus 110 is similar to liquid level detector apparatus 10 except that the reflector 32 has been replaced by a second sheath 132. In this embodiment, it can be seen that two sheaths 116 and 132 are inserted into the vessel 12. Each of the sheaths is identical to sheath 16 in FIG. 1 and each contain a liquid couplant 18. Inserted into sheath 116 is a probe 120 having an ultrasonic transmitter 122 contained on one end and a calibrated scale 26 contained on its other end. Inserted into the sheath 132 is a second probe 120' which is similar to probe 120 except that it contains an ultrasonic receiver 124 on its lower end. Probes 120 and 120' are each movably inserted into their respective sheaths 116 and 132 and are coupled together to move simultaneously by a conventional coupling means 119. Associated with the ultrasonic transmitter 122 and the ultrasonic receiver 124 is an electronic control circuit 40 which is identical to that described in connection with FIG. 1.

It will be recalled that the reflector 32 in FIG. 1 and FIG. 3 was used to establish a fixed path of travel for an ultrasonic wave generated by the ultrasonic transmitter 22 which was ultimately received as an echo by the ultrasonic receiver 24. Since the fixed length of travel of the ultrasonic wave was known, it was determined that if liquid were present, the wave would travel in a predetermined time. Liquid level detector 110 operates utilizing the identical principle. In this instance, the fixed path of travel is defined by the distance that the ultrasonic receiver 124 is spaced apart from the ultrasonic transmitter 122. As the ultrasonic transmitter 122 generates an ultrasonic wave, it must first pass through the liquid couplant 18 and the wall 21 of the sheath 120. This interface corresponds to the interface shown in FIG. 2 of the ultrasonic wave passing through the liquid couplant 18 and the wall 21. Next, the ultrasonic wave would pass either through the liquid lading 14 or the air 15 between the sheaths 116 and 132. Again, this is similar to the wave form as shown in FIG. 3. Next, transmitted wave will pass through the wall 21' of the sheath 132 and through the liquid couplant 18 contained therein and be received by the ultrasonic receiver 124. Since the distance is fixed, the time of travel of the ultrasonic signal will indicate whether or not the path of travel of the ultrasonic wave passes through the liquid lading 14 or the air 15 in a manner similar to that described in connection with FIGS. 1 and 3.

It should be understood, of course, that the foregoing disclosure relates to only the preferred embodiments of the invention and that numerous modifications or alternations may be made therein without departing from the spirit and the scope of the invention as set forth in the appended claims.

What is claimed is:

1. An apparatus for detecting the presence or absence of a liquid lading in a vessel comprising:
    a sheath insert means adapted to be inserted into said vessel whereby at least a portion of said sheath insert means is immersed within said liquid lading;
    liquid couplant means contained within said sheath insert means;
    transmitting means, a portion of which is located within said sheath insert means, adapted to transmit an ultrasonic signal through the wall of said sheath insert means;
    receiving means, a portion of which is located within said sheath insert means, adapted to receive said transmitted ultrasonic signal;
    first means for establishing a signal path of fixed length through which said ultrasonic signal must travel from said transmitting means to said receiving means wherein a portion of said signal path is adapted to pass through the wall of said sheath insert means and into said vessel; and
    circuit means associated with said transmitting means and said receiving means whereby said circuit means is responsive to the magnitude and time duration of said ultrasonic signal travelling through said fixed signal path thereby indicating the presence or absence of said liquid lading.

2. The apparatus of claim 1 wherein said transmitting means and said receiving means each include a transducer, each transducer being movably mounted within said sheath insert means whereby said signal path may be selected to pass through said liquid lading.

3. The apparatus of claim 2 wherein said ultrasonic signal is received by said receiving means within a preselected time interval only when said signal path passes through said liquid lading thereby indicating the presence or the absence of said liquid lading.

4. The apparatus of claim 3 wherein said first means comprises a reflector means located within said vessel and spaced a fixed distance from said sheath insert means and wherein said ultrasonic signal from said transmitting means is reflected by said reflecting means and received by said receiving means in said preselected time interval only when said ultrasonic signal passes through said liquid lading.

5. The apparatus of claim 3 wherein said sheath insert means comprises a first sheath and a second sheath.

6. The apparatus of claim 5 wherein said first means comprises said transmitting transducer and said receiving transducer movably mounted within said first and second sheaths, respectively, and said first and second sheaths being spaced a fixed distance apart thereby establishing said signal path of fixed length.

7. An apparatus for detecting the presence or absence of a liquid lading in a vessel comprising:
    a sheath adapted to be inserted into said vessel whereby at least a portion of said sheath is immersed within said liquid lading;
    liquid couplant means contained within said sheath;
    reflector means located within said vessel and spaced a fixed distance from said sheath;
    probe means, a portion of which is movably inserted into said sheath, said probe means including a transmitting means and a receiving means, said transmitting means adapted to transmit an ultrasonic signal toward said reflector means through the wall of said sheath into said vessel and said receiving means adapted to receive said ultrasonic signal reflected by said reflector means; and
    circuit means associated with said transmitting means and said receiving means whereby said circuit means is responsive to the magnitude and time duration of said reflected ultrasonic signal wherein said time duration and magnitude of said reflected signal is indicative of the presence or absence of said liquid lading.

8. The apparatus of claim 7 wherein said receiving means comprises:
    a receiving transducer adapted to receive said reflected ultrasonic signal and produce a first electrical signal proportional to the magnitude of said reflected ultrasonic signal;
    detector means responsive to said first electrical signal and adapted to produce a second signal only when said first signal exceeds a preselected magnitude.

9. The apparatus of claim 8 wherein said transmitting means comprises:
    a transmitting transducer adapted to generate said ultrasonic signal toward said reflector means in response to a pulse input signal;
    signal generating means adapted to produce a periodic third electrical signal; and
    pulse generating means responsive to said third electrical signal and adapted to provide said pulse input signal to said transmitting transducer.

10. The apparatus of claim 9 wherein said circuit means comprises a comparator means adapted to compare said second signal from said detector means and said third electrical signal from said signal generating means whereby the coincidence of said second and third signals indicates the presence or non-presence of said liquid lading.

11. The apparatus of claim 10 wherein said second and third signals are adapted to coincide when the position of said transmitting producer is below the level of said liquid lading.

12. The apparatus of claim 11 wherein said signal generating means includes interval means for establishing a time period during which said comparator means is operative, said time period being less than said time duration of travel of said ultrasonic signal through gas during the absence of said liquid lading.

13. The apparatus of claim 12 wherein said liquid couplant means exhibits a higher boiling point and a lower freezing point than said liquid lading.

14. The apparatus of claim 6 wherein said trans-mitting transducer is adapted to transmit said ultrasonic signal toward said receiving transducer and wherein said receiving transducer is adapted to receive said ultrasonic signal and produce a first electrical signal proportional to said ultrasonic signal.

15. The apparatus of claim 14 wherein said receiving means further comprises detector means responsive to said first electrical signal and adapted to produce a second signal only when said first signal exceeds a preselected magnitude.

16. The apparatus of claim 15 wherein said transmitting means further comprises:
    signal generating means adapted to produce a periodic third electrical signal; and
    pulse generating means responsive to said third electrical signal adapted to provide a pulse input signal to said transmitting transducer wherein said transmitting transducer generates said ultrasonic signal.

17. The apparatus of claim 16 wherein said circuit means comprises a comparator means adapted to compare said second signal and third electrical signal whereby the coincidence of said second and third signals indicates the presence or non-presence of said liquid lading.

18. The apparatus of claim 17 wherein said signal generating means includes interval means for establishing a time period during which said comparator means is operative and wherein said time period is less than said time duration of said ultrasonic signal travelling from said transmitting means to said receiving means through gas during the absence of said liquid lading.

UNITED STATES PATENT OFFICE
CERTIFICATE OF CORRECTION

Patent No. 3,656,134                    Dated April 11, 1972

Inventor(s)  Fred Brown

It is certified that error appears in the above-identified patent and that said Letters Patent are hereby corrected as shown below:

Column 3, line 15, after "sheath" insert the number -16-.

Column 4, line 40-41, after "time" delete ."oscilloscope.", and insert  - interval - .

Column 8, line 50, change "trans-mitting" to - transmitting

Signed and sealed this 5th day of September 1972.

(SEAL)
Attest:

EDWARD M. FLETCHER, JR.                  ROBERT GOTTSCHALK
Attesting Officer                        Commissioner of Patents